(12) United States Patent
Chand et al.

(10) Patent No.: US 7,849,051 B2
(45) Date of Patent: Dec. 7, 2010

(54) EXTRACTION OF LOGICAL EVENTS FROM NETWORK DATA

(75) Inventors: Jagdish Chand, Fremont, CA (US);
Suresh Antony, San Jose, CA (US);
Rajesh Bhargava, Fremont, CA (US);
Avanti Nadgir, Sunnyvale, CA (US);
Jagannatha Narayanareddy, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 957 days.

(21) Appl. No.: 11/673,880

(22) Filed: Feb. 12, 2007

(65) Prior Publication Data
US 2008/0195636 A1    Aug. 14, 2008

(51) Int. Cl.
*G06F 7/00* (2006.01)
*G06F 17/00* (2006.01)

(52) U.S. Cl. .................................. 707/603; 707/602
(58) Field of Classification Search .................. None
See application file for complete search history.

(56) References Cited

U.S. PATENT DOCUMENTS

| 5,155,842 A | 10/1992 | Rubin | |
|---|---|---|---|
| 2005/0187947 A1* | 8/2005 | Wortendyke et al. | 707/100 |
| 2010/0114952 A1* | 5/2010 | Scanlon et al. | 707/770 |

* cited by examiner

*Primary Examiner*—Uyen T. Le
(74) *Attorney, Agent, or Firm*—Weaver Austin Villeneuve and Sampson LLP (57) ABSTRACT

In an embodiment of the present invention, a record is read a single time, and it is evaluated against all conditions to identify the ones that it satisfies. By organizing the conditions into appropriate data structures, the process may be further optimized by ensuring that the record is not scanned multiple times.

19 Claims, 6 Drawing Sheets

EXTRACTION OF LOGICAL EVENTS FROM NETWORK DATA

BACKGROUND OF THE INVENTION

1. Field of the Invention

The present invention relates to network usage data. More particularly, the present invention relates to the extraction of logical events from network data.

2. Description of the Related Art

The process of analyzing Internet-based actions such as web surfing patterns is known as web analytics. One part of web analytics is understanding how user traffic flows through a network (also known as user paths). This typically involves analyzing which nodes a user encounters when accessing a particular network. In large networks such as, for example, large search engine/directories, billions of pageviews may be generated per day. As such, analyzing this huge amount of data can be daunting. Such analysis is needed, however, to determine common user behavior in order to optimize the network for better user engagement and network integration.

When running multiple queries against a given set of data, answering those queries can be very time-consuming. Business needs often require querying some table against different sets of conditions and identifying the records that satisfy each set. Businesses view the occurrence of each such set of values in the data as a logical event that occurred, and want to know how many times such an event occurred. For example, if the data being queried are web logs and contain the identification of each page visited, then the business may be interested in knowing how many times a particular page was visited. The business may have a number of such distinct logical events defined and would want to query the web logs in the least possible time to obtain the results.

Executing a separate query for each set is very inefficient because each record will need to be fetched multiple times. Depending on the size of the data being queried and the number of queries, this process may take a long time.

What is needed is a solution that allows multiple queries to be executed against a set of records at the same time in an efficient manner.

SUMMARY OF THE INVENTION

In an embodiment of the present invention, a record is read a single time, and it is evaluated against all conditions to identify the ones that it satisfies. By organizing the conditions into appropriate data structures, the process may be further optimized by ensuring that the record is not scanned multiple times.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well-known features may not have been described in detail to avoid unnecessarily obscuring the invention.

In an embodiment of the present invention, a record containing network data is read a single time, and it is evaluated against all conditions to identify the ones that it satisfies. The network data may have been generated by another number of different mechanisms, but in one embodiment may have been generated by a pathing engine that tracks and organizes user navigation information. By organizing the conditions into appropriate data structures, the process may be further optimized by ensuring that the record is not scanned multiple times. It should be noted that how the data is actually stored may be irrelevant to the described process, as long as the data is uniform (e.g., organized into records with each record having the same number of fields).

Several business questions may be answered using the processes described herein, such as, for example, the following:

1. How many times was a particular web page viewed?
2. What are the values for a given field or set of fields when an event occurs?

In an embodiment of the present invention, metadata comprises all of the rules which need to be evaluated on a given data set. A rule may correspond to the WHERE clause when querying a database table using SQLplus or a similar language. The rule may signify a logical event definition for the business question and hence will be referred to as an event. In other words, an event defines a series of conditions that, if satisfied, make the entire event true.

Events may be represented in the following format:
<eventid>^A<condition1>^A[condition2] . . .

where eventid is an identification given to the rule and conditionX is a condition specified on some field. ConditionX may have the following format:
<field_nm>^B<operand>^B<value> where field_nm may be the name of a field in the record, operand may be the condition to be evaluated, and value may be the value against which the operand is to be matched. An event may have one or more conditions specified as part of its definition—each separated from the other using a ^A. For example, if the data contains the fields name, age, gender, and country, then events could be defined as:

```
e1^Aage^B>^B20^Acountry^B=^BUS  // people over 20 and residing in US
e2^Agender^B=^BM               // all men
e3^Aage^B>^B20^Agender^B=^BM   // males over 20
```

For purposes of optimization, in an embodiment of the present invention, the metadata may first be reorganized so that all the events have the same number of conditions defined. This may be performed with the help of the operator "exists." If one of the events defines a condition on field A, then all the other events that did not define any condition on field A may be added a new condition "field A exists," which may always evaluate to true since all the records contain uniform sets of fields. The value in the case of this operator is immaterial and may be set to 0. At the end of the reorganization, all the events may have conditions defined on the same set of fields. For example, the sample events above may be converted to:

```
e1^Aage^B>^B20^Agender^Bexists^B0^Acountry^B=^BUS
e2^Aage^Bexists^B0^Agender^B=^BM^Acountry^Bexists^B0
e3^Aage^B>^B20^Agender^B=^BM^Acountry^Bexists^B0
```

Figure 1:
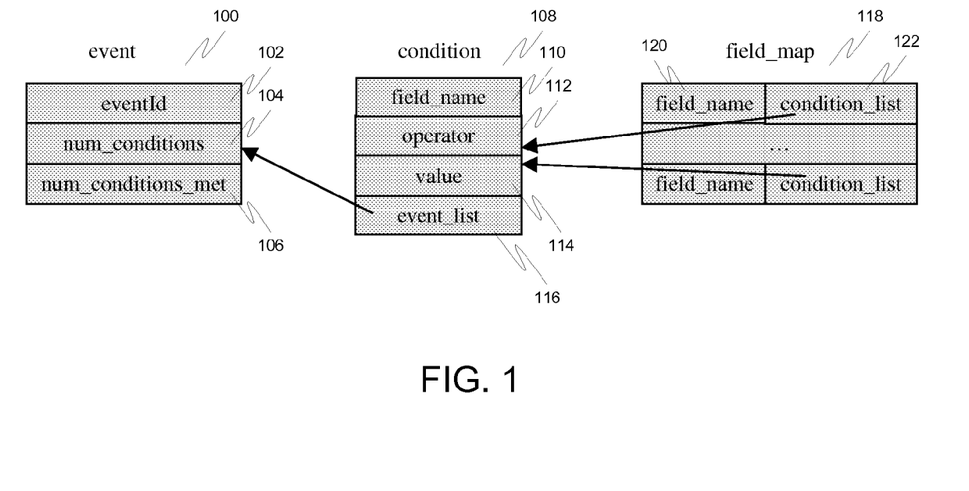
FIG. 1 is a diagram illustrating how metadata is represented in memory in accordance with an embodiment of the present invention.

FIG. 1 is a diagram illustrating how metadata is represented in memory in accordance with an embodiment of the present invention. An event record 100 may represent an event. There may be one instance of the event class per event. It may include an eventID 102 identifying the event, num_conditions 104 indicating the number of conditions specified as part of the event, and num_conditions_met 106 indicating the number of conditions satisfied by the current record being processed.

A condition record 108 may represent a condition. There may be one instance of the condition class for each unique condition specified as part of the event definitions. The condition record 108 may include a field_name 110 identifying the condition, an operator 112 indicating an operation that needs to be satisfied as part of the condition (e.g., =, !=, <, etc.), a value 114 indicating the value against which the operand(s) are to be matched, and an event_list 116 identifying a list of events which have this condition as part of their definition.

A field map record 118 may be a map of field names to the list of conditions specified on them. The field map record 118 may include a field_name 120, indicating the name of the field on which the condition is specified, and a condition_list 122, indicating a list of conditions specified on the field across all events.

It should be noted that while the term "record" is utilized above, this term should be interpreted broadly to refer to any data structure that may contain the corresponding data.

Figure 2:
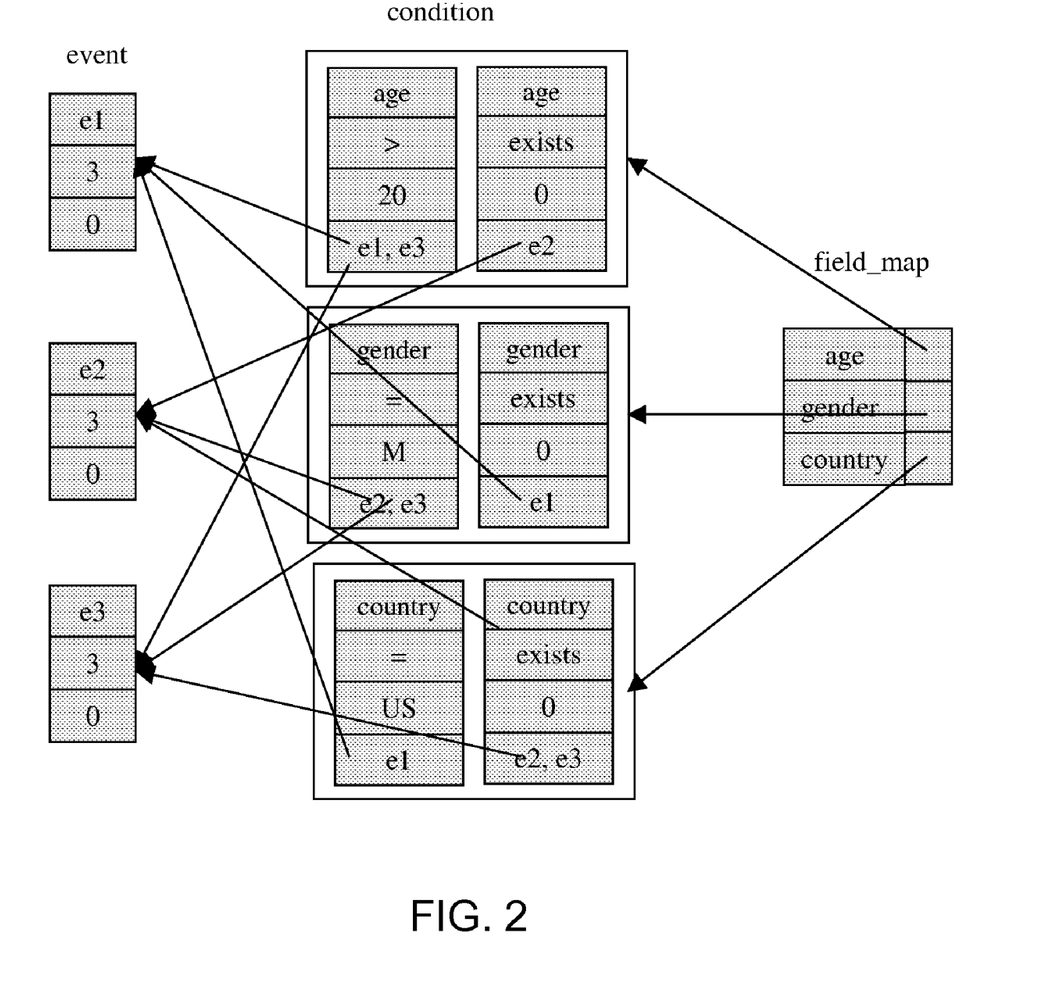
FIG. 2 is a diagram illustrating an example of metadata represented in memory in accordance with an embodiment of the present invention.

FIG. 2 is a diagram illustrating an example of metadata represented in memory according to the example events described above.

When evaluating queries, an embodiment of the present invention may make use of an additional object—working_set. This object may maintain a list of events that can be used for narrowing down the number of events that may satisfy each record. This will be described in more detail below.

Figure 3:
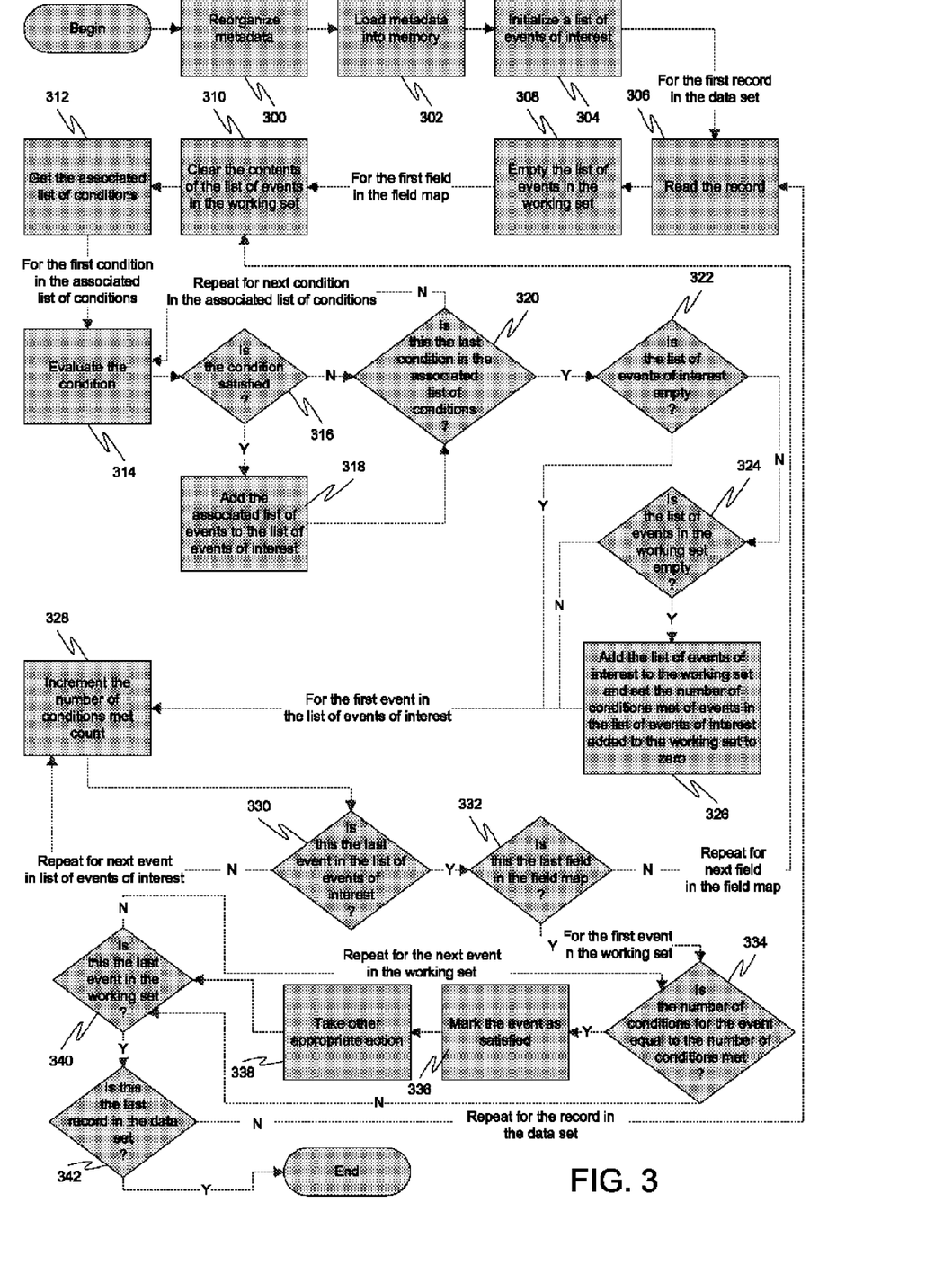
FIG. 3 is a flow diagram illustrating a method for extracting logical events from network data in accordance with an embodiment of the present invention.

FIG. 3 is a flow diagram illustrating a method for extracting logical events from network data in accordance with an embodiment of the present invention. At 300, the metadata may be reorganized. This may include, as described above, normalizing the metadata so that the rules in the metadata each have the same number of fields. At 302, the metadata may be loaded into memory. This may include, as described above, organizing the metadata into event records, condition records, and field map records, as well as potentially a working set record. At 304, a list of events of interest may be initialized. At 306, a loop for each record in the data set may be started by reading the (first) record. At 308, the list of events in the working set may be emptied. At 310, a loop for each field in the field map may be started by clearing the contents of the list of events of interest. At 312, the associated list of conditions may be retrieved.

At 314, a loop for each condition in the list may be started by evaluating the condition. At 316, it may be determined if the condition is satisfied. If so, then at 318, the associated list of events may be added to the list of events of interest. At 320, it may be determined if this is the last condition in the associated list of conditions. If not, then the loop may be repeated starting at 314 for the next condition in the associated list of conditions. If this was the last condition in the associated list of conditions, then at 322, it may be determined if the list of events of interest is empty and at 324 it may be determined if the list of events in the working set is empty. If the list of events of interest is not empty and the list of events in the working set is empty, then at 326, the list of events of interest may be added to the working set and the number of conditions met of events in the list of events of interest added to the working set may be set to zero. At 328, a loop may be started for the first event in the list of events of interest by incrementing the number of conditions met count for the event. Then at 330, it may be determined if this is the last event in the list of events of interest. If not, then the process may loop back to 328 and repeat for the next event in the list of events of interest. If this is the last event in the list of events of interest, then at 332 it may be determined if this is the last field in the field map. If not, then the process may loop back to 310 and repeat for the next field in the field map. If this is the last field in the field map, then at 334 a loop may be started for the first event in the working set by determine if the number of conditions for the event is equal to the number of conditions met. If so, then at 336 the event may be marked as satisfied and at 338, other appropriate action (such as fetching some attributes or performing aggregation) may be taken.

Once this is finished, or if the number of conditions for the event is not equal to the number of conditions met, then at 340 it may be determined if this is the last event in the working set. If not, then the process may loop back to 334 and repeat for the next event in the working set. If this is the last event in the working set, then at 342 it may be determined if this is the last record in the data set. If not, then the process may loop back to 306 and repeat for the next record in the data set. If this is the last record in the data set, then the process may end.

Figure 4:
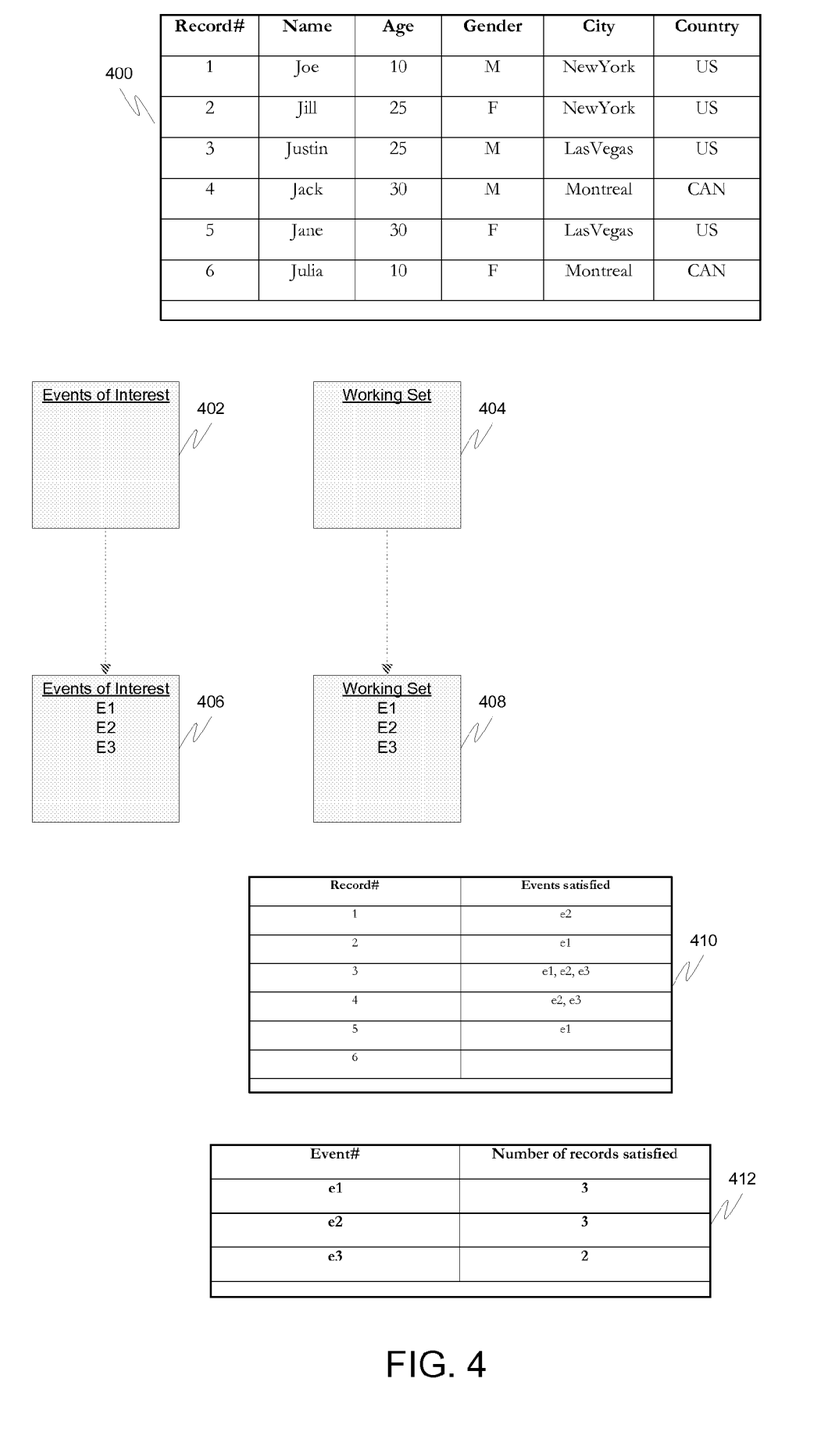
FIG. 4 is a diagram illustrating an example execution of the method of FIG. 3 in accordance with an embodiment of the present invention.

FIG. 4 is a diagram illustrating an example execution of the method of FIG. 3 in accordance with an embodiment of the present invention. 400 depicts an example data set. Assuming a sample events set of:

```
e1^Aage^B>^B20^Acountry^B=^BUS  // people over 20 and residing in US
e2^Agender^B=^BM               // all men
e3^Aage^B>^B20^Agender^B=^BM   // males over 20
``` then the first step would be to reorganize the metadata, which would then make it appear as:

```
e1 Aage B> B20 Agender Bexists B0 Acountry B= BUS
e2 Aage Bexists B0 Agender B= BM Acountry Bexists B0
e3 Aage B> B20 Agender B= BM Acountry Bexists B0
```

Following this, the metadata may then be loaded into memory, resulting in the metadata depicted in FIG. 2. Then a list of events of interest may be initialized. This is depicted as 402 and is initially empty. Then a loop begins for each record in the data set. Starting with the first record (Joe), the record is read. A working set 404 is emptied (although in this first pass it is likely already empty). Then each field in the field map is examined. First, the contents of the list of events in the working set is cleared. Then an associated list of conditions for the field may be retrieved. Here, the first field (age) has two associated conditions. Each of these is looped through and evaluated to see if it is satisfied. Therefore, for the first condition (age>20), the first record is evaluated to see if it is true. Here Joe is 10, therefore the condition is not satisfied. The next condition (age exists) is satisfied by this record, and as such the associated list of events (e2) is added to the list of events of interest. Since all the conditions for this field have been examined, the process then determines if the list of events of interest is empty. Here is it not. Then, since the list of events in the working set is empty, the list of events is then added to the working set, making both the working set and the list of events of interest contain e2. Then the number of conditions met in the list of events of interest added to the working set is set to zero (initialized, as this working set will be used later).

Then a loop is begun for the events in the list of events of interest. Here, the only event in the list of events of interest is e2, so the number of conditions met count is incremented to 1 (so far, for event 1, only the age exists condition has been satisfied). Once that loop is completed, the next field in the field map (gender) may be examined and the process repeated. Once all the fields in the field map have been exampled for the first record, the list of events of interest will be as such depicted as 406 and the working set as 408. Then the events in the working set may each be examined to determine if the number of conditions matches the number of condition met. Here, only e2 has the number of conditions equal to the number of conditions met (3 each). Therefore, e2 may be marked as satisfied for the first record and appropriate action taken, such as aggregating the record as displayed in the first entry in 410 and/or the second entry in 412. The process may then be repeated for each of the remaining records, resulting in the results of 410 and 412.

As such, each record need only be read once and evaluated against all events. Additionally, only fields which have some condition defined on it are considered for evaluation. Through these techniques, the input/output time will be reduced significantly. Since input/output time is the primary bottleneck in high speed processor systems, this process greatly enhances the functioning of such systems.

Figure 5:
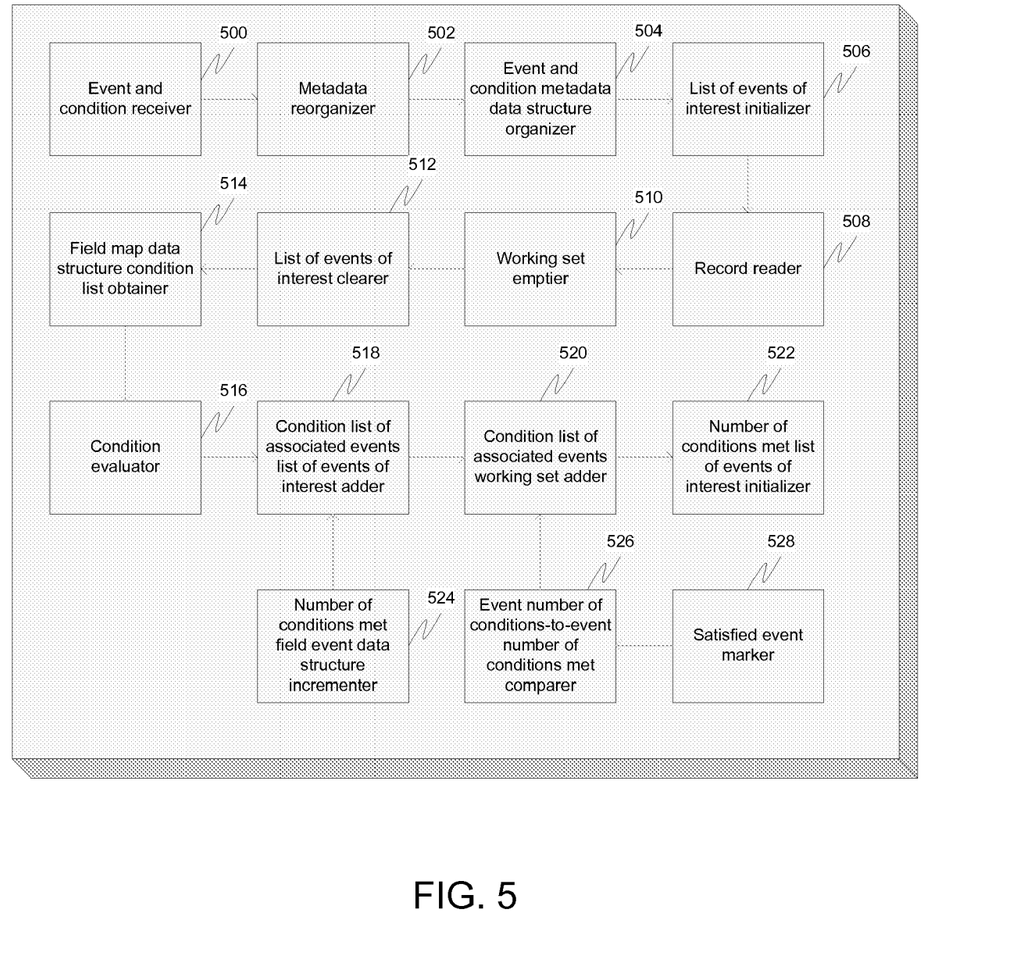
FIG. 5 is a block diagram illustrating an apparatus for extracting logical events from network data in accordance with an embodiment of the present invention.

FIG. 5 is a block diagram illustrating an apparatus for extracting logical events from network data in accordance with an embodiment of the present invention. An event and condition receiver 500 may receive one or more events having one or more conditions. A metadata reorganizer 502 coupled to the event and condition receiver 500 may reorganize the metadata. This may include, as described above, normalizing the metadata so that the rules in the metadata each have the same number of fields. An event and condition metadata data structure organizer 504 coupled to the metadata reorganizer 502 may load the metadata into memory. This may include, as described above, organizing the metadata into event records, condition records, and field map records, as well as potentially a working set record. A list of events of interest initializer 506 coupled to the event and condition metadata data structure organizer 504 may initialize a list of events of interest. A loop for each record in the data set may be started by reading the (first) record using a record reader 508 coupled to the list of events of interest initializer 506. Then a working set emptier 510 coupled to the record reader 508 may empty the list of events in the working set. A loop for each field in the field map may be started by using a list of events of interest clearer 512 coupled to the working set emptier 510 to clear the contents of the list of events of interest. Then a field map data structure condition list obtainer 514 coupled to the list of events of interest clearer 512 may retrieve the associated list of conditions.

A loop for each condition in the list may be started by evaluating the condition using a condition evaluator 516 coupled to the field map data structure condition list obtainer 514. If the condition is satisfied, then a condition list of associated events list of events of interest adder 518 coupled to the condition evaluator may add the associated list of events to the list of events of interest. Once all the conditions have been looped through, it may be determined if the list of events of interest is empty and it may be determined if the list of events in the working set is empty. If the list of events of interest is not empty and the list of events in the working set is empty, then a condition list of associated events working set adder 520 coupled to the condition list of associated events list of events of interest adder 518 may add the list of events of interest to the working set and a number of conditions met list of events of interest initializer 522 coupled to the condition list of associated events working set adder 520 may set the number of conditions met of events in the list of events of interest added to the working set to zero. A loop may then be started for the first event in the list of events of interest by incrementing the number of conditions met count for the event using a number of conditions met field event data structure incrementer 524 coupled to the condition list of associated events list of events of interest adder 518.

Once all the events have been looped through, and all the fields have been looped through, then a loop may be started for the first event in the working set by determining if the number of conditions for the event is equal to the number of conditions met using an event number of conditions-to-event number of conditions met comparer 526 coupled to the condition list of associated events working set adder 520. If so, then the event may be marked as satisfied by a satisfied event marker 528 coupled to the event number of conditions-to-event number of conditions met comparer 526 and other appropriate action (such as fetching some attributes or performing aggregation) may be taken. Once all the events in the working set have been looped through, and all the records in the data set have been looped through, then the process may end.

Figure 6:
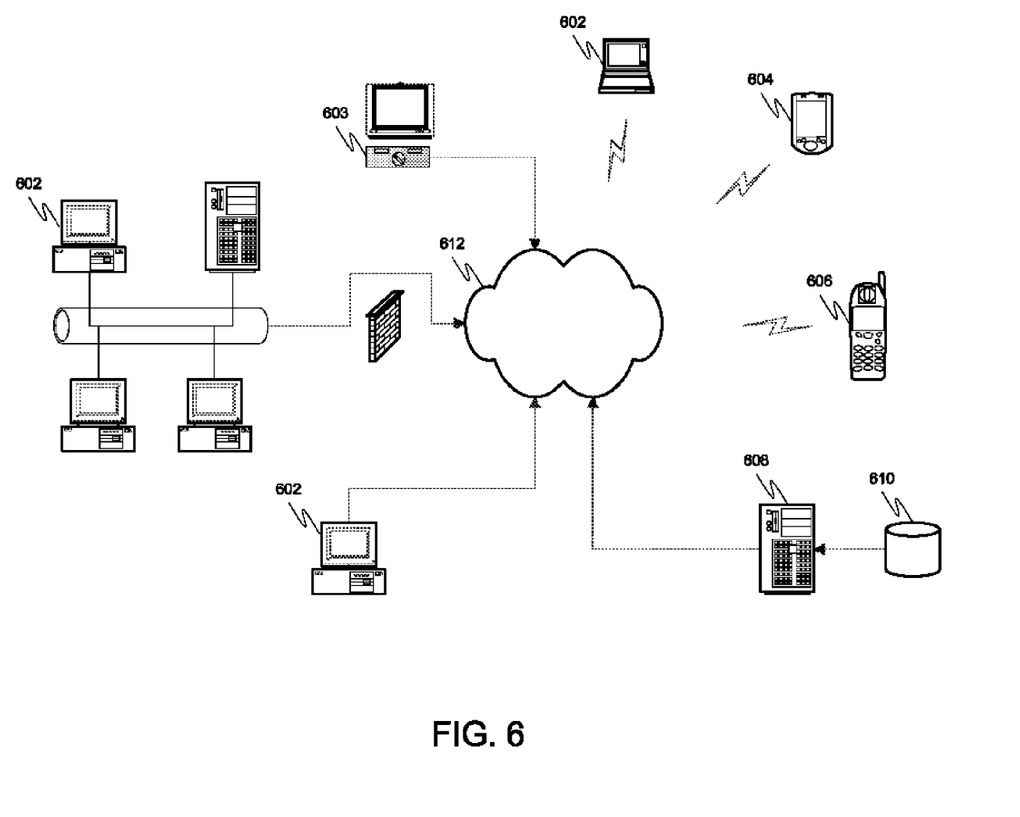
FIG. 6 is an exemplary network diagram illustrating some of the platforms that may be employed with various embodiments of the invention.

It should also be noted that the present invention may be implemented on any computing platform and in any network topology in which search categorization is a useful functionality. For example and as illustrated in FIG. 6, implementations are contemplated in which the node path files described herein is employed in a network containing personal computers 602, media computing platforms 603 (e.g., cable and satellite set top boxes with navigation and recording capabilities (e.g., Tivo)), handheld computing devices (e.g., PDAs) 604, cell phones 606, or any other type of portable communication platform. Users of these devices may navigate the network, and path information may be collected by server 608. Server 608 may then store and access path information in an efficient manner, as well as store and evaluate various events for the network information in order to aid in answering business questions. Applications may be resident on such devices, e.g., as part of a browser or other application, or be served up from a remote site, e.g., in a Web page, (represented by server 608 and data store 610). The invention may also be practiced in a wide variety of network environments (represented by network 612), e.g., TCP/IP-based networks, telecommunications networks, wireless networks, etc.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for evaluating network data, wherein the network data comprises one or more records, the method comprising:

receiving one or more events, each of the events having one or more conditions that, if all satisfied, render the corresponding event satisfied;

organizing the events and conditions into metadata data structures for each of the records in the network data;

for each field in a field map data structure in the metadata data structures, wherein the field map data structure contains a mapping of field names to a list of conditions specified on the field names:

obtaining a list of conditions associated with the field from the field map data structure;

for each condition in the list of conditions associated with the field:

retrieving a list of events associated with the condition from a condition data structure in the metadata data structures, wherein the condition data structure contains information regarding conditions within the events;

adding the list of events associated with the condition to a list of events of interest if the condition is satisfied by the data in the record;

adding the list of events associated with the condition to a working set of events;

for each of the events in the list of events of interest:

incrementing a field representing the number of conditions met for the event in an event data structure in the metadata data structures, wherein the event data structure contains information regarding the events;

for each event in the working set of events:

determining if the number of conditions for the event is equal to the number of conditions met for the event by examining the event data structure in the metadata data structures; and marking the event as satisfied if the number of conditions for the event is equal to the number of conditions met for the event.

2. The method of claim 1, wherein the metadata data structures include:

a field map table having a list of all possible fields of the conditions and a list of which conditions contain which fields, a condition data structure for each condition; and an event data structure for each event.

3. The method of claim 2, wherein the condition data structure contains a field name for the corresponding condition, an operator, a value, and a list of associated events representing the events that contain the corresponding condition.

4. The method of claim 2, wherein the event data structure contains an identification of the event, a count of the number of conditions to be satisfied for the event, and a count of the number of conditions met for the event.

5. The method of claim 1, further comprising:

reorganizing the metadata data structures so that there are an equal number of conditions defined for each event.

6. The method of claim 5, wherein the reorganizing includes adding dummy conditions to the metadata data structure, wherein a dummy condition is a condition that is always true.

7. The method of claim 1, further comprising organizing events marked as satisfied into a list indicating the satisfied events.

8. The method of claim 7, wherein the list indicating the satisfied events further includes a count of the number of records that satisfied each event.

9. The method of claim 1, further comprising creating a summary table indicating, for each record, the events which were satisfied by the record.

10. An apparatus for evaluating network data, wherein the network data comprises one or more records, the apparatus comprising:

means for receiving one or more events, each of the events having one or more conditions that, if all satisfied, render the corresponding event satisfied;

means for organizing the events and conditions into metadata data structures for each of the records in the network data;

means for, for each field in a field map data structure in the metadata data structures, wherein the field map data structure contains a mapping of field names to a list of conditions specified on the field names:

obtaining a list of conditions associated with the field from the field map data structure;

for each condition in the list of conditions associated with the field:

retrieving a list of events associated with the condition from a condition data structure in the metadata data structures, wherein the condition data structure contains information regarding conditions within the events;

adding the list of events associated with the condition to a list of events of interest if the condition is satisfied by the data in the record;

adding the list of events associated with the condition to a working set of events;

for each of the events in the list of events of interest:

incrementing a field representing the number of conditions met for the event in an event data structure in the metadata data structures, wherein the event data structure contains information regarding the events;

for each event in the working set of events:

determining if the number of conditions for the event is equal to the number of conditions met for the event by examining the event data structure in the metadata data structures; and marking the event as satisfied if the number of conditions for the event is equal to the number of conditions met for the event.

11. A program storage device readable by a machine, tangibly embodying a program of instructions executable by the machine to perform a method for evaluating network data, wherein the network data comprises one or more records, the method comprising:

receiving one or more events, each of the events having one or more conditions that, if all satisfied, render the corresponding event satisfied;

organizing the events and conditions into metadata data structures for each of the records in the network data;

for each field in a field map data structure in the metadata data structures, wherein the field map data structure contains a mapping of field names to a list of conditions specified on the field names:

obtaining a list of conditions associated with the field from the field map data structure;

for each condition in the list of conditions associated with the field:

retrieving a list of events associated with the condition from a condition data structure in the metadata data structures, wherein the condition data structure contains information regarding conditions within the events;

adding the list of events associated with the condition to a list of events of interest if the condition is satisfied by the data in the record;

adding the list of events associated with the condition to a working set of events;

for each of the events in the list of events of interest:

incrementing a field representing the number of conditions met for the event in an event data structure in the metadata data structures, wherein the event data structure contains information regarding the events;

for each event in the working set of events:

determining if the number of conditions for the event is equal to the number of conditions met for the event by examining the event data structure in the metadata data structures; and marking the event as satisfied if the number of conditions for the event is equal to the number of conditions met for the event.

12. The program storage device of claim 11, wherein the metadata data structures include:

a field map table having a list of all possible fields of the conditions and a list of which conditions contain which fields, a condition data structure for each condition; and an event data structure for each event.

13. The program storage device of claim 12, wherein the condition data structure contains a field name for the corresponding condition, an operator, a value, and a list of associated events representing the events that contain the corresponding condition.

14. The program storage device of claim 12, wherein the event data structure contains an identification of the event, a count of the number of conditions to be satisfied for the event, and a count of the number of conditions met for the event.

15. The program storage device of claim 11, further comprising:

reorganizing the metadata data structures so that there are an equal number of conditions defined for each event.

16. The program storage device of claim 15, wherein the reorganizing includes adding dummy conditions to the metadata data structure, wherein a dummy condition is a condition that is always true.

17. The program storage device of claim 11, further comprising organizing events marked as satisfied into a list indicating the satisfied events.

18. The program storage device of claim 17, wherein the list indicating the satisfied events further includes a count of the number of records that satisfied each event.

19. The program storage device of claim 11, further comprising creating a summary table indicating, for each record, the events which were satisfied by the record.

* * * * *